(12) United States Patent
Lewkoski

(10) Patent No.: US 8,307,889 B2
(45) Date of Patent: Nov. 13, 2012

(54) ASSEMBLY FOR CONTROLLING ANNULI BETWEEN TUBULARS

(76) Inventor: Randy Lewkoski, Shiner, TX (US)

( * ) Notice: Subject to any disclaimer, the term of this patent is extended or adjusted under 35 U.S.C. 154(b) by 315 days.

(21) Appl. No.: 12/779,044

(22) Filed: May 13, 2010

(65) Prior Publication Data

US 2011/0278023 A1 Nov. 17, 2011

(51) Int. Cl.
*E21B 19/00* (2006.01)

(52) U.S. Cl. ...................................... 166/85.5; 166/380

(58) Field of Classification Search ............... 166/93.1, 166/94.1, 97.1, 75.13, 85.5, 85.1, 379, 380, 166/386, 368, 341; 285/148.27, 178
See application file for complete search history.

(56) References Cited

U.S. PATENT DOCUMENTS

| | | | | |
|---|---|---|---|---|
| 1,548,543 | A | * | 8/1925 | Moody .................... 166/85.1 |
| 2,179,814 | A | * | 11/1939 | Conaghan .................. 277/329 |
| 2,246,417 | A | * | 6/1941 | Smith ........................ 166/66 |
| 3,163,217 | A | | 12/1964 | Haeber |
| 3,292,708 | A | | 12/1966 | Mundt |
| 3,451,481 | A | | 6/1969 | Lanmon |
| 3,847,215 | A | | 11/1974 | Herd |
| 3,899,200 | A | * | 8/1975 | Gamble ..................... 285/93 |
| 4,223,738 | A | | 9/1980 | Boutet et al. |
| 4,415,186 | A | | 11/1983 | Maestrami |
| 4,499,950 | A | | 2/1985 | Watkins |
| 4,771,828 | A | | 9/1988 | Cassity |
| 4,771,832 | A | * | 9/1988 | Bridges ..................... 166/380 |
| 4,825,948 | A | | 5/1989 | Carnahan |
| 4,900,041 | A | | 2/1990 | Hopkins et al. |
| 5,092,401 | A | | 3/1992 | Heynen |
| 5,372,198 | A | | 12/1994 | North et al. |
| 5,479,995 | A | * | 1/1996 | Falgout, Sr. .................. 175/74 |
| 5,927,405 | A | | 7/1999 | Monjure et al. |
| 6,070,668 | A | | 6/2000 | Parks et al. |
| 6,334,633 | B1 | | 1/2002 | Nguyen et al. |
| 6,431,282 | B1 | | 8/2002 | Bosma et al. |
| 6,675,898 | B2 | | 1/2004 | Staudt |
| 6,701,661 | B2 | | 3/2004 | Murello |
| 6,779,602 | B1 | | 8/2004 | Van Bilderbeek et al. |
| 6,871,708 | B2 | | 3/2005 | Calder et al. |
| 7,004,260 | B2 | | 2/2006 | Bosma et al. |
| 7,121,349 | B2 | | 10/2006 | Jennings |
| 7,191,830 | B2 | | 3/2007 | McVay et al. |
| 7,281,543 | B2 | | 10/2007 | Calkins et al. |
| 7,370,708 | B2 | | 5/2008 | Simpson et al. |
| 7,392,840 | B2 | | 7/2008 | Griffith et al. |
| 7,401,792 | B2 | | 7/2008 | Smirra |
| 2004/0113368 | A1 | | 6/2004 | Smirra |
| 2009/0120648 | A1 | * | 5/2009 | Khazanovich et al. ........ 166/379 |
| 2010/0230165 | A1 | * | 9/2010 | Beach et al. .................. 175/44 |

* cited by examiner

*Primary Examiner* — Giovanna Wright
*Assistant Examiner* — Kipp Wallace
(74) *Attorney, Agent, or Firm* — John K. Buche; Buche & Associates, P.C.

(57) ABSTRACT

The present application is directed to an assembly for controlling an annulus between tubulars. The assembly comprising a first annular member securable to the outer tubular; a second annular member securable to the first annular member; wherein each of the first and second annular members have eccentric bores therethrough.

9 Claims, 11 Drawing Sheets

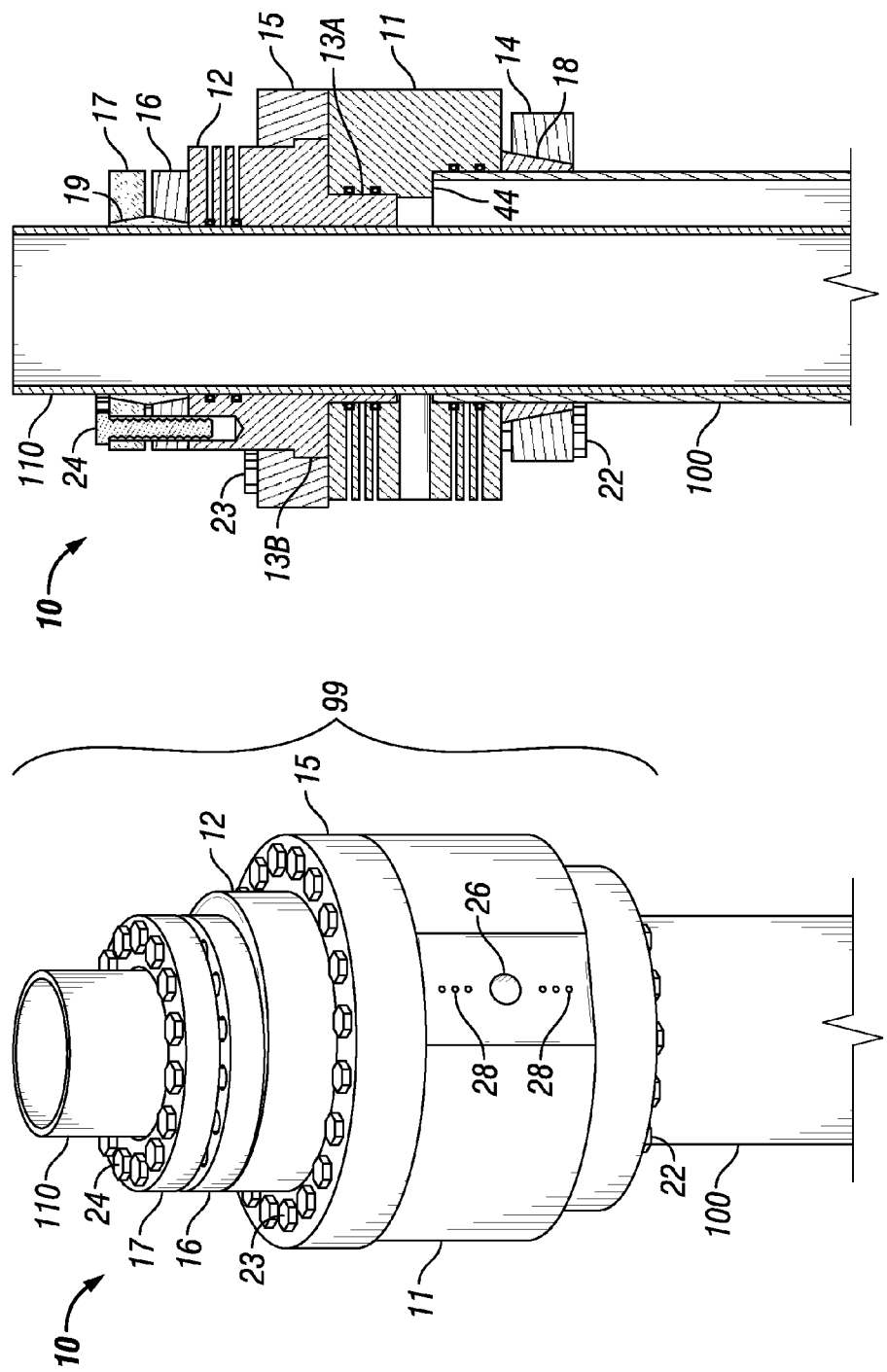

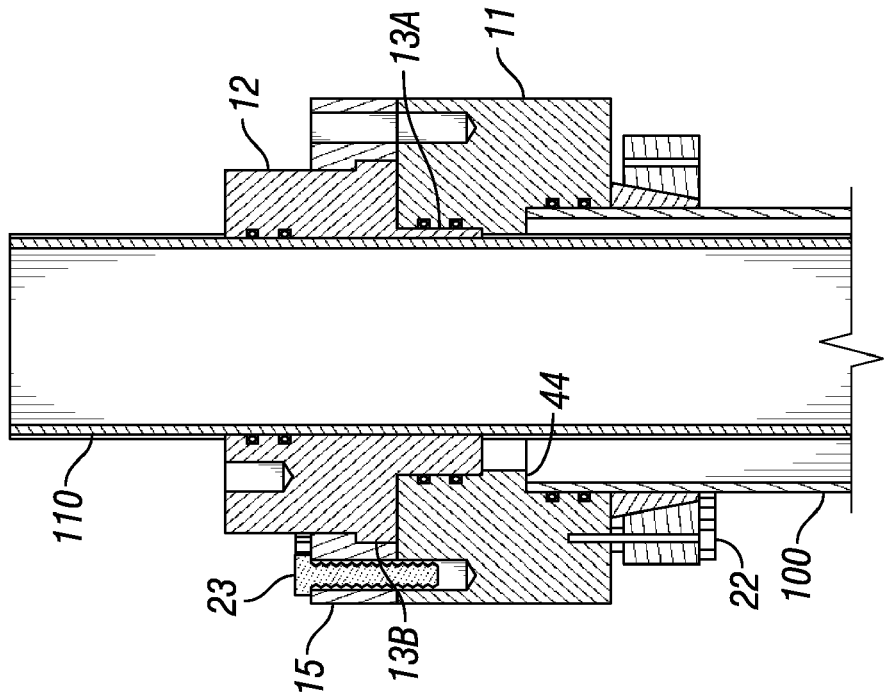
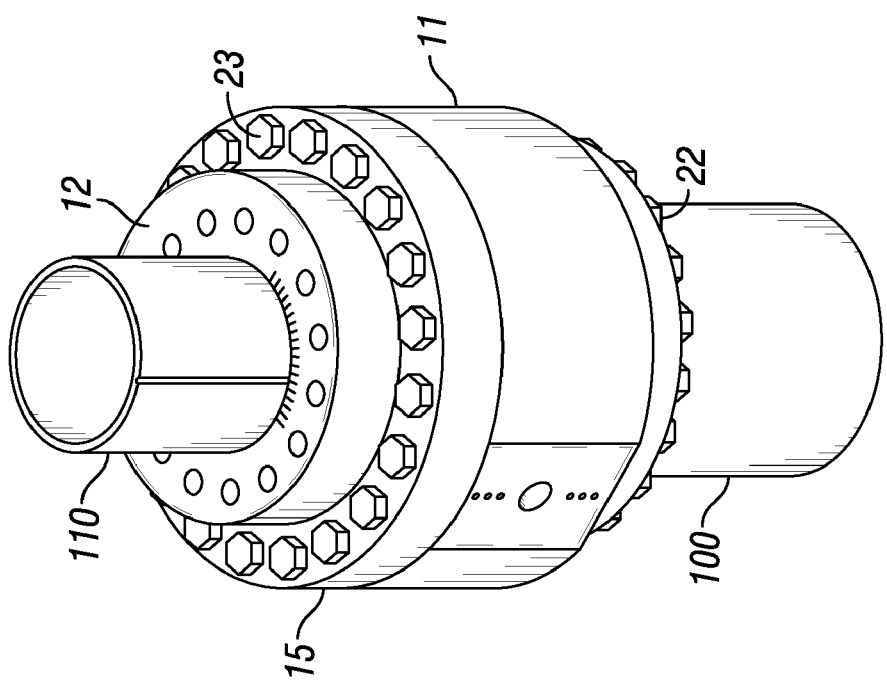

ASSEMBLY FOR CONTROLLING ANNULI BETWEEN TUBULARS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE APPLICATION

The application relates generally to controlling annuli between tubulars, including supply tubing used in production wells.

BACKGROUND

During the life of an oil or gas well, it may become necessary to control the supply tubing and annuli there between to prevent leaking of production fluid from the annuli or to restore annular pressure integrity to the well. For example, if a subsea well is damaged in a storm, the well may require repair or other form of preparation to ready the well for abandonment in a manner involving the isolation, sealing, or securing of target annuli. With regard to land wells, it may become necessary to control target annuli in preparation for plugging and abandonment.

If the tubulars of the supply tubing are arranged concentrically, controlling well annuli is often clear-cut. For example, a standard wellhead may be installed to simply gain control of the well. However, when tubulars of a supply tubing are not concentrically aligned, it may be difficult to simply install a standard wellhead to gain control of well annuli. For instance, when a subsea well is bent, it is difficult to install a wellhead near the bend due to the short lever arm available to move the tubulars into concentric alignment. In the case of a grouted well, it is difficult to install a standard wellhead at a cut location of the well when the tubulars are eccentric given that the grout prevents movement of the tubulars.

An effective technique for controlling annuli between nonconcentric tubulars is needed.

SUMMARY

The present application is directed to an assembly for controlling an annulus between tubulars. The assembly comprising a first annular member securable to the outer tubular; a second annular member securable to the first annular member; wherein each of the first and second annular members have eccentric bores therethrough.

The present application is also directed to an assembly for controlling a terminal end of tubulars, one tubular disposed within the other. The assembly comprising a first annular member securable to the outer tubular; a second annular member securable to the first annular member; wherein each of the first and second annular members have eccentric bores therethrough.

The present application is also directed to an assembly for controlling at least one annulus between three or more tubulars. The assembly comprising a first annular member securable to an outer tubular of the target annulus; a second annular member securable to the first annular member; wherein each of the first and second annular members have eccentric bores therethrough.

The present application is also directed to an assembly for controlling an annulus between nonconcentric casings of a production well. The assembly comprising (a) a first slip member disposed about the outer casing; (b) a first securing ring disposed about the first slip member; (c) a first annular member securable to the outer casing via the first securing ring; (d) a second annular member operationally configured to abut the first annular member; (e) a second securing ring for securing the second annular member to the first annular member, the second securing ring being disposed about the outer surface of the second annular member; (f) a second slip member disposed about the inner casing; and (g) a third securing ring disposed about the second slip member, the third securing ring being operationally configured to secure the second annular member to the inner casing; wherein each of the first and second annular members have eccentric bores therethrough.

The present application is also directed to a method for sealing an annulus between nonconcentric tubulars, comprising (a) providing a first annular member having an eccentric bore therethrough and a second annular member having an eccentric bore therethrough; (b) securing the first annular member to the end of the outer tubular in a desired orientation for covering at least a portion of the annulus; and (c) securing the second annular member to the first annular member in a manner effective to cover the remaining portion of the annulus.

The present application is also directed to a method for controlling an annulus between nonconcentric tubulars comprising the following: (a) providing an assembly including a first annular member securable to the outer tubular; a second annular member securable to the first annular member; wherein each of the first and second annular members have eccentric bores therethrough and wherein the first and second annular members have corresponding alignment scales effective for aligning each annular member about the tubular members in a manner effective for controlling the annulus, each alignment scale including a circular scale comprising a plurality of tick marks along the inner edge of the bore wall of the corresponding annular member, the tick marks representing intervals including a sweep angle ranging from zero degrees up to at least about 90 degrees; (b) determining the angular relationship between the tubulars and the first and second annular members; (c) securing the first annular member to the outer tubular at an orientation according to said relationship; and (d) securing the second annular member to the first annular member at an orientation according to said relationship.

BRIEF DESCRIPTION OF THE FIGURES

The novel features believed to be characteristic of the present invention are set forth in the appended claims. The invention itself however, as well as a preferred mode of use, further objects, and advantages thereof, will best be understood by reference to the following detailed description when read in conjunction with the accompanying drawings.

FIG. 3A is a perspective view of an embodiment of an assembly in a secured orientation with a well.

FIG. 3B is a cross-sectional view of an embodiment of an assembly in a secured orientation with a well.

FIG. 7A is a perspective view of an embodiment of the assembly secured to a well.

FIG. 7B is a cross-sectional view of an embodiment of the assembly secured to a well.

BRIEF DESCRIPTION

Figure 1:
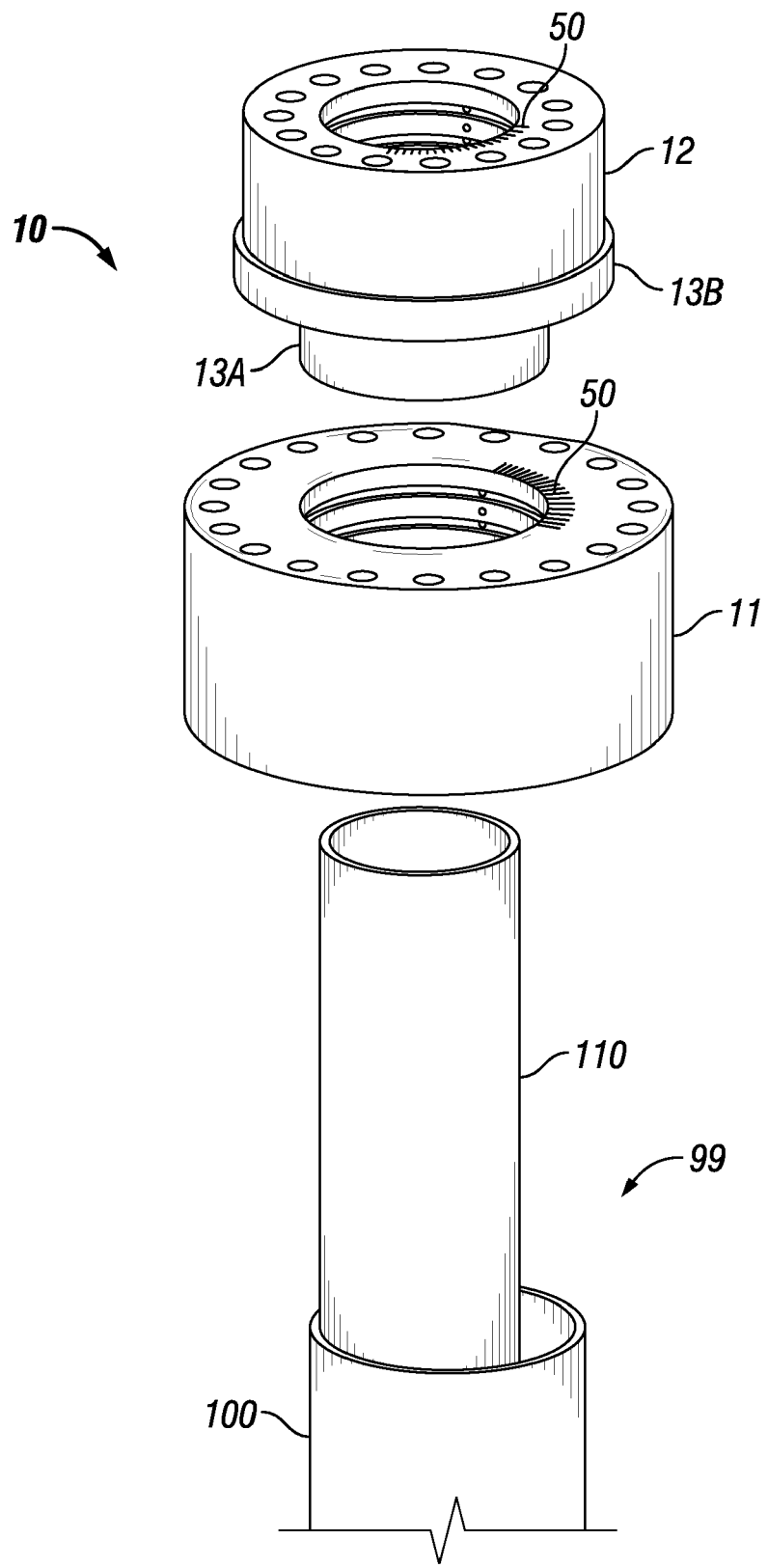
FIG. 1 is an exemplary view of the annular members of the present assembly.

Before describing the invention in detail, it is to be understood that the present assembly, system, and method are not limited to particular embodiments. It is also to be understood that the terminology used herein is for the purpose of describing particular embodiments only, and is not intended to be limiting. As used in this specification and the appended claims, the terms "control," "controlling," and like terms refer to one or more of securing, isolating, containing, shutting, plugging, enclosing, segregating, and sealing an annulus between tubulars. The term "tubular" may refer to simple piping material. In petroleum type applications, "tubular" may refer to casings, liners, production tubing, production screens and the like, as commonly used in oil/gas production wells. The term "eccentric" in relation to an annular member bore ("spool" bore) refers to the bore being offset, not situated in the center of the annular member or spool. The term "eccentric" in relation to tubulars refers to the tubulars not having a common center, i.e., not concentric. The term "fluid" may refer to liquids, gases, drilling mud, product, control fluid, and combinations thereof. The term "production well" may refer to oil wells, gas wells, water wells, geothermal wells or other wells comprising two or more tubulars one disposed within the other. The term "remediation" as used in relation to well remediation refers to the act of correcting a problem atypical of normal well operation or well production. In one simplified embodiment, well remediation may refer to controlling a well prior to abandonment of the well. In another simplified embodiment, well remediation may refer to well plugging and abandonment ("P & A") as the term is known to persons of ordinary skill in the art.

In one aspect, the application is directed to establishing control of damaged wells.

In another aspect, the application is directed to re-entry of an abandoned well or a temporarily abandoned well.

In another aspect, the application is directed to economical solutions to control producing wells with unusual casing scenarios, e.g., where a well operator desires to utilize a two-stage wellhead already in his/her possession, but needs to control an additional annulus of the well.

In another aspect, the application provides an assembly for isolating an annulus between non-concentric tubulars.

In another aspect, the application provides an assembly for containing an annulus between non-concentric tubulars.

In another aspect, the application provides an assembly for sealing an annulus between non-concentric tubulars.

In another aspect, the application provides a method for isolating an annulus between non-concentric tubulars.

In another aspect, the application provides a method for containing an annulus between non-concentric tubulars.

In another aspect, the application provides a method for sealing an annulus between non-concentric tubulars.

In another aspect, the application provides a system for isolating and/or containing and/or sealing an annulus of a well comprised of non-concentric casings.

In another aspect, the application provides a method for securing well casings relative to each other to prevent movement of the casings, including preventing sliding and/or ballooning of the casings as each term is known to those of ordinary skill in the art.

In another aspect, the application provides an assembly operationally configured to prevent movement of well casings relative to each other, including the prevention of sliding and/or ballooning.

In another aspect, the application provides a system for controlling well casings to prevent movement of the casings, including any sliding and/or ballooning of the casings.

In another aspect, the application provides a method for monitoring annular pressure and returns within a well.

In another aspect, the application provides an assembly for monitoring annular pressure and returns within a well.

In another aspect, the application provides a method for transporting well control materials to and from an annular volume.

In another aspect, the application provides an assembly for transporting well control materials to and from an annular volume.

In another aspect, the application provides a system for transporting well control materials to and from the annular volume.

In another aspect, the application provides an assembly, system and method for remediating damaged wells including wells having non-concentric tubulars.

In another aspect, the application provides an assembly, system and method for isolating and/or containing and/or sealing and/or plugging grouted wells having non-concentric casings.

In another aspect, the application provides an assembly, system and method for isolating and/or containing and/or sealing damaged subsea wells comprising either of concentric casings or non-concentric casings.

In another aspect, the application provides a method of gaining control of a damaged well by installing an assembly operationally configured to control each well annulus.

In another aspect, the application provides a method of gaining control of a damaged well by installing an assembly operationally configured to control each well annulus, followed by installing a standard wellhead.

In another aspect, the application provides an assembly for controlling an annulus of a well having grouted non-concentric casings prior to installing a wellhead on the well.

In another aspect, the application provides an assembly for use in place of known tie-back methods for adding flexibility to a well during wellhead installation.

In another aspect, the application provides an assembly comprising adjacent annular members, i.e., adjacent spools, each having an eccentric bore therethrough.

In another aspect, the application provides a method for implementing a single stage wellhead onto a well comprised of non-concentric tubulars.

In another aspect, the application provides an assembly usable above water or subsea.

In another aspect, the application provides an assembly comprised of two annular members each having an eccentric bore. The bores may be of equal offset or differing offsets as desired.

In another aspect, the application provides an assembly comprised of two annular members each having an eccentric bore. The annular members may be assembled so that concentricity between the bores may be achieved. In the alternative, the annular members may be assembled to produce varying amounts of eccentricity between bores of the annular members.

In still another aspect, the application provides an assembly operationally configured according to A.P.I. tolerance standards for tubing and casing as understood by persons of ordinary skill in the art of production tubing.

In yet another aspect, the application provides a subsea assembly for controlling annuli between non-concentric tubulars of a damaged well including a well bent either above or below the mudline.

In another aspect, the application provides an assembly for controlling an annulus between non-concentric tubulars of a production well, implementation of the assembly considering the effects of all combinations of pressure, temperatures and temperature changes which may occur at any time during the operation of the well.

Discussion of the Assembly, System, And Method

In simplest terms, the invention may be employed to control annuli or an annulus between tubulars. In one aspect the present invention may be employed to control annuli generally. In another aspect, the invention may be employed to control annuli of production wells including supply tubing. In one particular embodiment, the invention is discussed in terms of controlling an annulus between non-concentric tubulars in a production well or as related to abandoning a production well having at least two non-concentric tubulars defining a main bore and at least one annular chamber there between. In still another particular embodiment, the invention is discussed in relation to wellhead installation on wells having grouted non-concentric tubulars.

To better understand the novelty of the invention and use thereof, reference is hereafter made to the accompanying drawings. With reference to FIG. 1, an exemplary embodiment of an assembly 10 for controlling an annulus between tubulars 100, 110 is provided. In one embodiment, the assembly 10 of FIG. 1 may be operationally configured to control the terminal end of tubulars 100, 110 having edges terminating at substantially similar points in space. In another embodiment, the assembly 10 may be operationally configured to control a terminal end of tubulars including an exposed inner tubular 110 as shown in FIG. 1.

In a first exemplary embodiment, the assembly 10 includes at least (1) a first annular member 11, and (2) a second annular member 12. Suitably, the first annular member 11 has a first surface operationally configured to abut the edge or rim of the outer tubular 100. In addition, the second annular member 12 includes a first surface operationally configured to abut a second surface of annular member 11—once assembled, the annular members 11, 12 are operationally configured to control the annulus between tubulars 100 and 110.

Depending on the type of tubulars targeted and the particular purpose of the assembly 10, each annular member suitably includes a particular bore of one or more inner diameters across the length of the bore necessary to control the annulus of the target tubulars. In a particularly advantageous embodiment, the assembly 10 comprises annular members 11 and 12 each having an eccentric bore therethrough. More particularly, each annular member 11, 12 suitably having an eccentric body including a particular offset for forming different wall thicknesses for the peripheral wall of the eccentric body of each annular member 11 and 12. In one embodiment, the annular members 11, 12 may have eccentric bores of substantially equal offset. In another embodiment, the annular members 11, 12 may have eccentric bores of unequal offset. In yet another embodiment, e.g., an assembly 10 custom made for a particular offset, the assembly 10 may include one annular member having a concentric bore formed therein while a corresponding annular member has an eccentric bore formed therein.

Suitably, the annular members 11, 12 are arranged about the tubulars 100 and 110 in a manner effective to control the annulus there between. As depicted in FIG. 1 where a portion of the inner tubular 110 is exposed, the annular members 11, 12 are suitably operationally configured to slip over the inner tubular 110 to control the annulus at a point about equal to the terminal edge of the outer tubular 100. Without limiting the mode of operation, the annular members 11, 12 are suitably slipped over the inner tubular 110 and rotated there about, wherein once assembled the peripheral wall of each annular member 11, 12 effectively controls the annulus between tubulars 100, 110.

Depending on the intended use of the assembly 10, additional assembly components may be implemented as desired. For example, the second annular member 12 may feature a neck 13A extending from the first surface of the second annular member 12, the neck 13A being operationally configured to mate with the bore of the first annular member 11 in a manner effective to promote control of the annulus between tubulars 100 and 110. Preferably, the outer diameter of the neck 13A is slightly less than the inner diameter of the bore of the first annular member 11 wherein the outer surface of the neck 13A lies substantially flush against the inner surface of the bore of the first annular member 11 once mated. As exemplified in FIG. 1 and discussed in more detail below, the second annular member 12 may also comprise a skirt 13B along its outer periphery, the skirt 13B being operationally configured to assist in maintaining the integrity of the assembly 10 during operation.

The assembly 10 may also comprise (1) one or more sealing means, and/or (2) one or more means for stabilizing the placement of the assembly 10 about the tubular members 100, 110—the sealing means and stabilizing means also being described in more detail below. With continuing reference to FIG. 1, each annular member 11 and 12 may further include an alignment scale 50 effective to align each of the annular members as desired when rotated about the tubular members 100, 110—the alignment scales 50 to be discussed more below.

Figure 2:
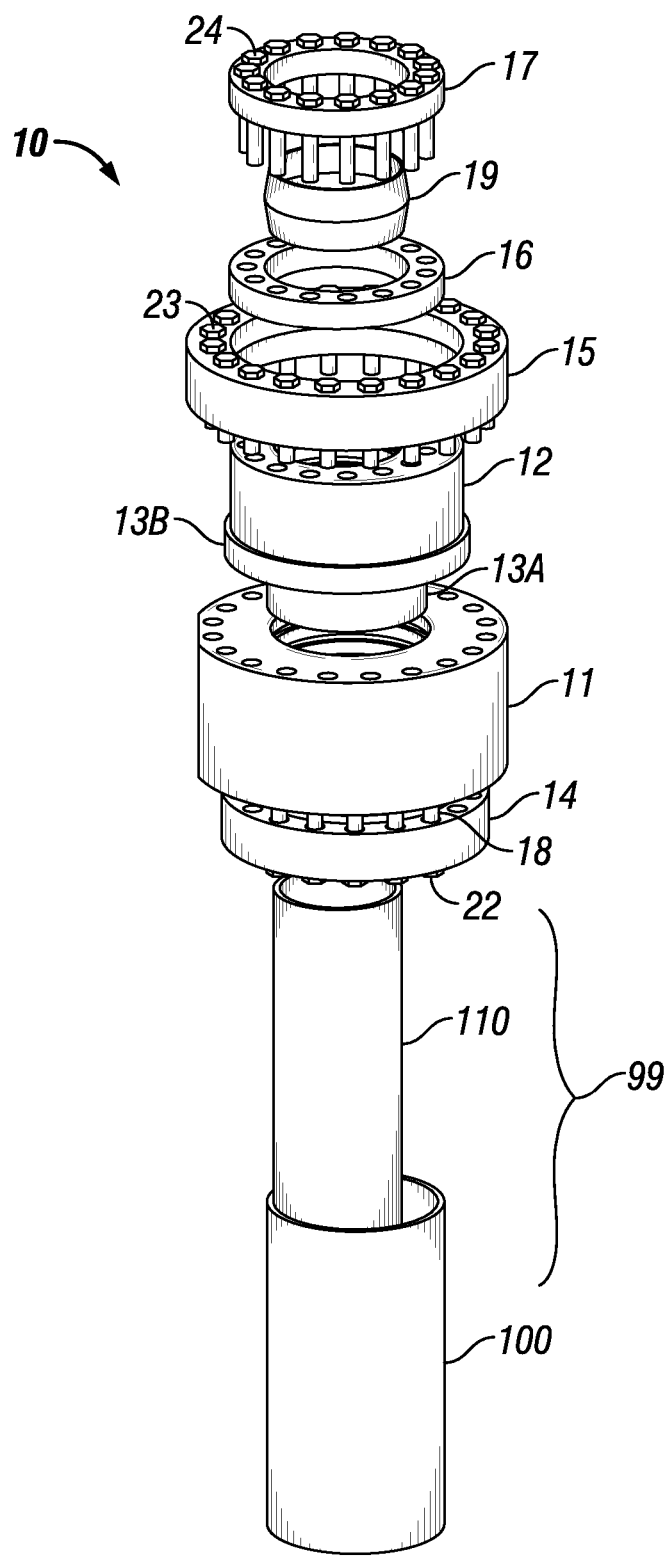
FIG. 2 is an exploded view of the various components comprising an embodiment of the present assembly.

In still other embodiments, the assembly 10 may incorporate one or more additional components depending on the type of annuli control desired. As shown in the simplified embodiment of FIG. 2, an assembly 10 suitable for controlling annuli of oil and gas wells may comprise one or more of additional components effective to maintain the integrity of the assembly 10 during operation. In addition to first and second annular members 11 and 12, the assembly 10 may also include a first securing ring 14 (also referred to as an "energizer ring" or "flange" by persons of ordinary skill in the art) for securing the first annular member 11 to a target well 99 about the outer tubular 100 (hereafter referred to as "outer casing 100"). The assembly 10 may also include a second securing ring 15 (also referred to as a "clamp ring" by persons of ordinary skill in the art) for securing the second annular member 12 to the first annular member 11. A third securing ring 16 and/or a fourth securing ring 17 (a.k.a. "energizer rings"), may also be secured to the second surface of the second annular member 12 to assist in securing the assembly 10 to the inner tubular 110 (hereafter referred to as "inner casing 110"). Bolts 22, 23, and 24 may also be implemented to secure the various components during assembly as illustrated in FIG. 3A.

Figure 12:
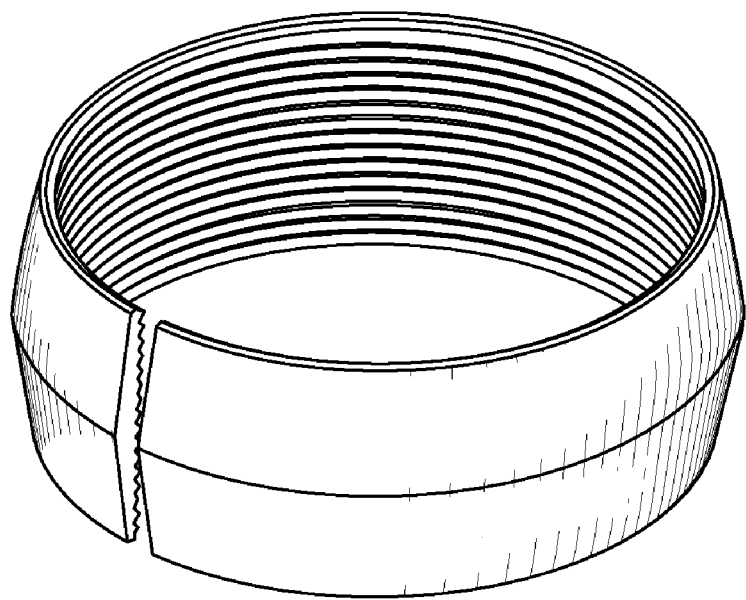
FIG. 12 is a perspective view of an embodiment of a slip member.

The assembly 10 may also include one or more casing slips (hereafter "slip members") as known to persons of ordinary skill in the art of wells. As illustrated in FIG. 3B, the assembly 10 may include one or more first slip members 18 disposed about the outer casing 100, and/or one or more second slip members 19 disposed about the inner casing 110—the slip members 18, 19 being operationally configured to (1) grip and stabilize the casings 100, 110, and/or (2) prevent the assembly 10 from releasing from the target well 99 due to pressure from within the well 99 and/or other forces. Suitable slip members are commercially available from the following commercial sources: National Oilwell Varco located in Houston, Tex.; and Cam-Tech Products, Inc. located in Houston, Tex. Another exemplary embodiment of a slip member is illustrated in FIG. 12, the slip member being constructed from a hardened material effective for biting into a well casing.

As discussed in more detail below, the assembly 10 may also comprise various sealing means disposed along the inner surface of the annular members 11, 12 for sealing the assembly 10 to terminal end of the well 99. As further illustrated in FIG. 3B, the first annular member 11 suitably comprises a bore having two distinct sections of differing inner diameters, the first and narrowest section forming a peripheral shoulder 44 within the bore operationally configured to abut the rim of the outer casing 100 wherein the outer casing 100 effectively mates with the second section of the bore. It is also contemplated that in another embodiment the first annular member 11 may comprise a bore of a substantially constant inner diameter including a raised lip along at least a section of its inner periphery, the lip section being operationally configured to function in a similar manner as the shoulder 44 during operation of the assembly 10.

It should be noted that the present assembly 10 may be built to scale depending on (1) the size of the tubulars and/or (2) the intended purpose and/or (3) the type of annuli to be controlled. Likewise, the materials of construction may be determined by one or more of the above qualifications. Without limiting the invention, suitable assembly 10 components are constructed from one or more materials including but not necessarily limited to, materials resistant to chipping, cracking, and breaking as a result of ozone, weathering, heat, moisture, other outside mechanical and chemical influences, as well as violent physical impacts. Suitable materials of construction for the annular members 11, 12 and securing rings 14, 15, 16, 17 include, but are not necessarily limited to composite materials, plastics, ferrous metals, non-ferrous metals, and combinations thereof. In one embodiment, the assembly 10 may be constructed from dense plastic. In another embodiment, the assembly 10 may be constructed from polytetrafluoroethylene (PTFE). In still another embodiment, the assembly 10 may be constructed from metal. In petroleum related applications operationally configured to control the annuli between tubulars of oil and gas wells, the assembly 10 may be constructed from steel or stainless steel. In a more particular embodiment of the assembly 10 configured to control annuli of oil and gas wells, each of the annular members 11, 12 and securing rings 14, 15, 16, 17, or at least the annular members 11, 12, are constructed from high carbon steel, including for example, 4140 Grade high carbon steel.

Without limiting the method of manufacturing, suitable metal annular members 11, 12 may be machined using a vertical lathe, or similar means. In addition, the accompanying securing rings 14, 15, 16, 17 may be formed using a vertical milling machine, or similar means. While conditions in oil and gas fields are too variable and stringent to provide perfect assurance of feasibility in every situation, the present assembly 10 is operationally configured to provide a degree of predictability as to when and where the assembly 10 may be used in a given pressure and/or tension application. For example, as related to oil and gas well applications, the assembly 10 components are suitably constructed to form an assembled fit not only within the American Petroleum Institute ("A.P.I.") tolerances with respect to typical API pipe tolerances, but also within a predetermined limit greater than the A.P.I. tolerances.

In one particular application, the assembly 10 may be used to secure subsea wells. For instance, oil and gas wells located in the Gulf of Mexico are often damaged during storms wherein the force of the storm can bend well tubulars at an angle or below the mudline resulting in the section of the well exposed above the mudline laying at an angle. If the original wellhead is inaccessible due to debris or is buried or damaged beyond service, a replacement will need to be installed to gain control of the well and to obtain the ability to monitor and diagnose the well before re-securing the well. Attempting to install a typical two or three stage wellhead on these types of wells is often difficult because the inner casing(s) are under different amounts of stress and are not typically substantially concentric to one another. Also, attempting to install a multi-stage wellhead close to a well bend is often difficult due to the short lever arm available to move the casings into concentric alignment. The present assembly 10, particularly when machined to within at least the A.P.I. specifications, provides a means to control annuli of a bent well or well with non-concentric casings prior to the installation of a standard single-stage wellhead or other well capping means. In still another embodiment, the assembly 10 may be implemented to control target annuli of a subsea well 99 in a manner suitable to thereafter attach a wellhead to the free end of the assembly 10 for further well production.

In another application, the assembly 10 may be used to control grouted wells having non-concentric casings, for instance, when a leak or other problem is discovered. Typical two or three stage wellheads generally cannot be installed in such situations due to the non-concentricity of the casings in addition to the grout intended to prevent movement of the casings. Rather than performing a "tie-back" (as the term is known by persons of ordinary skill in the art) to provide flexibility to install a standard wellhead, the present invention provides a more cost effective approach by (1) re-heading the well at the cut location with the assembly 10 (to control the target annulus), followed by (2) installing a standard wellhead, for example, a single stage wellhead, as desired.

Figure 4A:
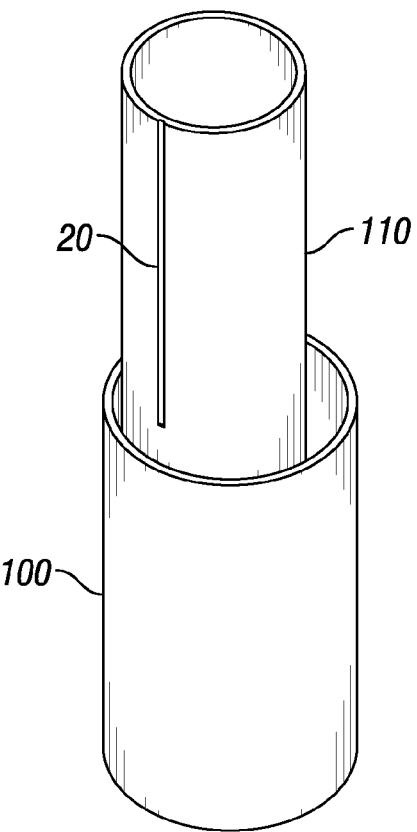
FIG. 4A is a perspective view of a well including an exposed inner casing.
Figure 4B:
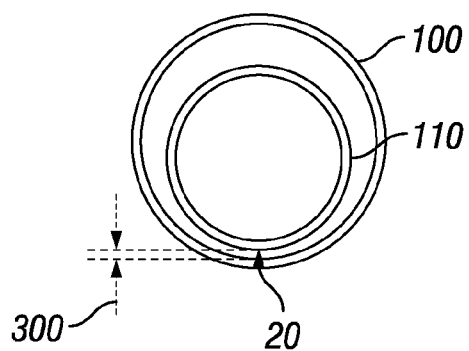
FIG. 4B is a top view of an inner casing and outer casing of an exemplary well including the casings in non-concentric alignment.

Beginning at FIG. 4A, a simplified discussion of assembly 10 installation on a subsea well 99 is provided. As shown, the outer casing 100 is suitably cut back in a manner effective to expose a desired length of the inner casing 110. The present invention does not require any particular length of exposure of the inner casing 110, only that the outer casing 100 be cut back a length necessary to operationally install and secure the assembly 10 to the casings 100, 110—compared to installation of standard multi-stage wellheads requiring specific casing cutting dimensions to properly fit a wellhead to a well. Thus, in a particularly advantageous embodiment, the outer casing 100 is cut back at a point to expose a length of the inner casing 110 greater than or equal to the length of the assembly 10. For example, another apparatus such as a wellhead or remediation wellhead may be attached to the inner casing 110 thereby requiring the outer casing 100 to be cut back at a point exposing a length of the inner casing 110 in excess of the length of the assembly 10.

Once the outer casing 100 is cut back, the casings 100, 110 may be cleaned or otherwise prepared for assembly 10 installation as desired. Suitably, the casings 100, 110 are cleaned or otherwise prepared in a manner effective to remove marine growth, rust, and scale, using known techniques. Suitable techniques include, but are not necessarily limited to high pressure water blasters, hand held grinders, and combinations thereof.

A novel feature of the present invention is that the assembly 10 may be installed about the well 99 according to the eccentricity of the casings 100, 110. In other words, the orientation or alignment of each of the annular members 11, 12 about the casings 100, 110 may be determined by the non-concentricity of the casings 100, 110. For example, in a particularly advantageous embodiment, the orientation or alignment of the annular members 11 and 12 about the casings 100, 110 may be determined by a value derived from the following equation:

$$\text{Alignment Value} = D^1/D^2 \times 90$$

where
(1) $D^1$=the minimum annular distance between non-concentric tubulars;
(2) $D^2$=the annular distance between the same tubulars if concentric to one another; and
(3) 90 represents the maximum rotational orientation required of each annular member 11, 12 to travel through a complete range of offsets, i.e., from complete eccentricity to complete concentricity.

Thus, the alignment value describes the angular relationship between the casings 100, 110 and the annular members 11 and 12.

Figure 4C:
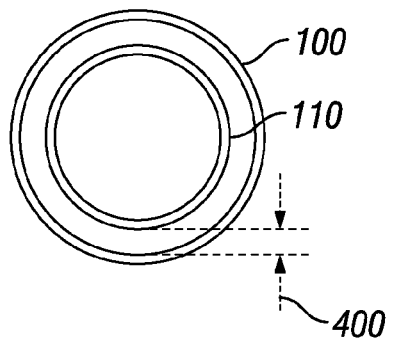
FIG. 4C is a top view of an inner casing and outer casing of an exemplary well including the casings in concentric alignment.

Regardless of the sequence of determining distances $D^1$ and $D^2$, in a suitable mode of operation the minimum annular distance 300 between casings 100, 110 is located and measured once the outer casing 100 is cut back, as shown in FIG. 4A. The annular distance 400, i.e., the distance between the casings 100, 110 if aligned concentrically, may simply be determined by knowing the outer diameter of inner casing 110 and the inner diameter of outer casing 100 (see FIG. 4C).

As illustrated in FIG. 4A, once the minimum annular distance 300 has been located, the outer surface of the inner casing 110 may be marked as indicated by line marking 20—the line marking 20 being effective for aligning the annular members 11, 12 in conjunction with the calculated alignment value and alignment scales 50 as explained below. In both subsea and above ground applications, the inner casing 110 may be marked with a grease pencil or like marker to establish the line marking 20. In another embodiment, an etching technique may be used to mark the location representing the minimum annular distance 300. As an alternative to a line marking 20, it is also contemplated that the minimum annular distance 300 may be marked by a dot, an "X", or like indicator effective to provide an accurate marker for the minimum annular distance 300.

Once distances $D^1$ and $D^2$ have been determined, an alignment value may be ascertained for orienting annular members 11 and 12 about the casings 100, 110. As stated above, the alignment value represents the angular relationship between the casings 100, 110 and the annular members 11 and 12. In like manner, the orientation of the corresponding alignment scales 50 upon the annular members 11, 12 are operationally configured so that each annular member may be rotated up to at least about 90 degrees about the casings in a manner effective to align the alignment scale 50 with the line marking 20—as determined by the calculated alignment value. With particular attention to the first annular member 11 of FIGS. 5A and 5B, a suitable alignment scale 50 includes a circular scale comprising a plurality of tick marks 51 along the inner edge of the bore wall of the annular member 11. Suitably, the tick marks 51 represent intervals including a sweep angle ranging from zero degrees up to 360 degrees. In a particularly advantageous embodiment, the tick marks 51 represent intervals including a sweep angle from zero degrees to about 90 degrees with tick marks 51 representing five degree intervals. In another embodiment, the alignment scale 50 may comprise both major and minor tick marks 51. For example, major tick marks may represent five degree intervals, while minor tick marks represent one degree intervals.

For the purposes of this application, the tick mark 51 zero ("0") degrees represents maximum eccentricity for each of the annular members 11 and 12. So, if the tick mark 51 representative of 0 degrees on each of the annular members 11, 12 is aligned with the line marking 20, the assembly 10 will operate to control a fully eccentric set of casings 100, 110. In other words, if both annular members 11, 12 are set to the tick mark 51 representative of 0 degrees, the eccentric values of the annular members 11, 12 are added together achieving maximum eccentricity of the assembly 10. As the annular members 11, 12 are rotated about the casings 100, 110 in opposite directions (one clockwise, the other counterclockwise), but by substantially equal amounts, the eccentric combination between the annular members 11, 12 changes and trends towards concentricity of the assembly 10. When the annular members 11, 12 are rotated 90 degrees in opposite directions, the relative rotation to each other is 180 degrees (one annular member 11 rotating 90 degrees one direction, the other annular member 12 rotating 90 degrees the other direction). At optimum maximum rotation of 90 degrees, the eccentric values of the annular members 11, 12 essentially cancel each other out and concentricity is achieved. Rotating the annular members 11, 12 beyond 90 degrees will start to increase eccentricity of the assembly 10 and is not required if the annular members 11, 12 are aligned properly with line marking 20.

Two requirements must be satisfied for the assembly 10 to be successfully installed. First, the correct assembly 10 eccentricity must be achieved, which is accomplished by rotating the annular members 11, 12 in opposite directions according to the calculated alignment value. Second, the assembly 10 must be orientated to the target well 99 according to line marking 20. Thus, the tick marks 51 are operationally configured to determine a local or relative orientation for achieving the proper amount of offset of each annular member 11, 12 while the line marking 20 is operationally configured to determine the global orientation of the assembly 10, i.e., optimal alignment of the assembly 10 about a target well 99. It is also contemplated herein that other values may be used according to the tick marks 51. For example, degrees may be replaced by (1) gradients (0-100) or (2) a decimal scale (0-10) as desired.

In operation, the first annular member 11 is suitably rotated about casings 100, 110 and fixed to the outer casing 100 so that the tick mark 51 representative of the calculated alignment value (depicted as about 24.5 degrees in FIG. 5B) is aligned with the line marking 20. As a result, the different wall thicknesses for the peripheral wall of the eccentric body of the first annular member 11 is effective to at least partially seal, isolate or cover the annulus between casings 100, 110. Once aligned, the first annular member 11 may be secured to the outer casing 100. In one embodiment, the first annular member 11 may be secured to the outer casing 100 via the first securing ring 14. In another embodiment, the first annular member 11 may further be secured to the outer casing 100 by tightening one or more first slip members 18 to the outer casing 100 via the attachment of the first securing ring 14 to the first annular member 11 using bolts 22. Optionally, one or more packer elements may be installed to seal and/or isolate a target well 99. As shown in FIG. 3B, the inner surface of the first securing ring 14 may be tapered according to the outer surface configuration of the one or more first slip members 18.

Figure 6B:
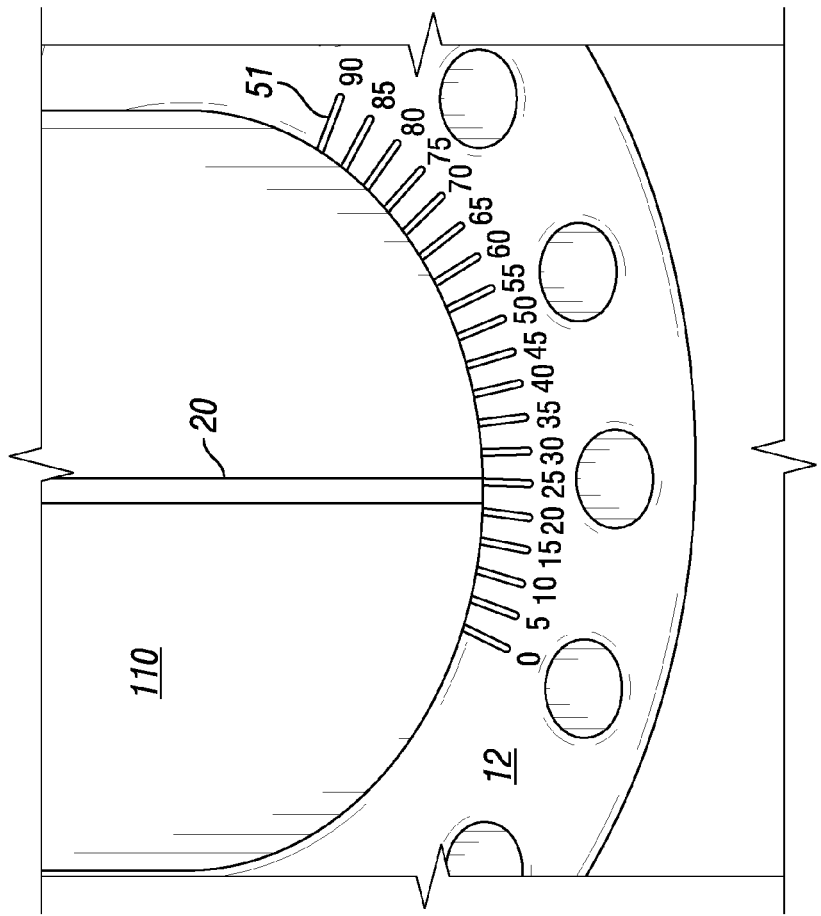
FIG. 6B is a detailed view of the second annular member including an alignment scale.
Figure 6A:
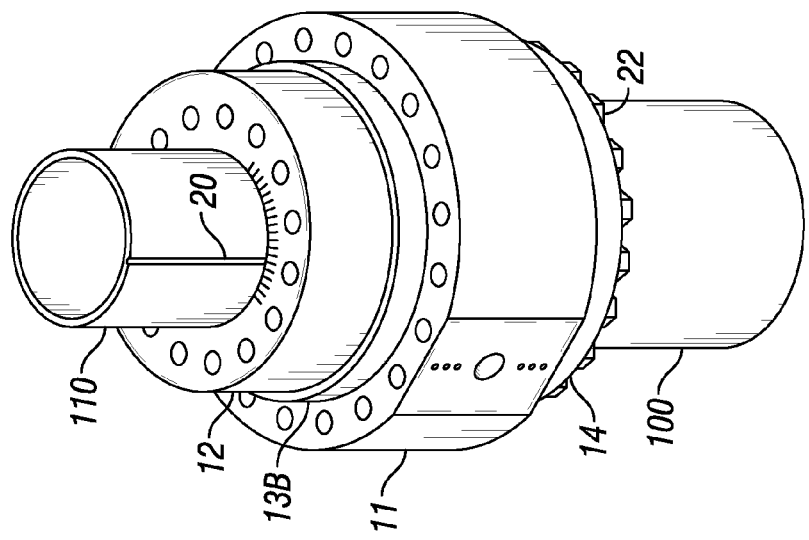
FIG. 6A is a perspective view of the first annular member and second annular member oriented about a well.

Once the first annular member 11 is secured, the second annular member 12 may be installed. With reference to FIGS. 6A and 6B, the second annular member 12 is suitably rotated about the inner casing 110 whereby a tick mark 51 representative of the calculated alignment value (depicted as 24.5 degrees in FIG. 6B) may be aligned with the line marking 20. Similar to above, the different wall thicknesses for the peripheral wall of the eccentric body of the second annular member 12 is effective to at least partially seal, isolate or cover the annulus between tubulars 100, 110. Thus, once each annular member is aligned according to the calculated alignment value, the annular members 11, 12 collectively are operationally configured to substantially seal, isolate or cover the annulus between the tubulars 100, 110. It should be noted that in other modes of operation the annular members 11, 12 may be aligned to seal, isolate or cover the annulus at varying degrees other than as determined by the alignment value.

Figure 7D:
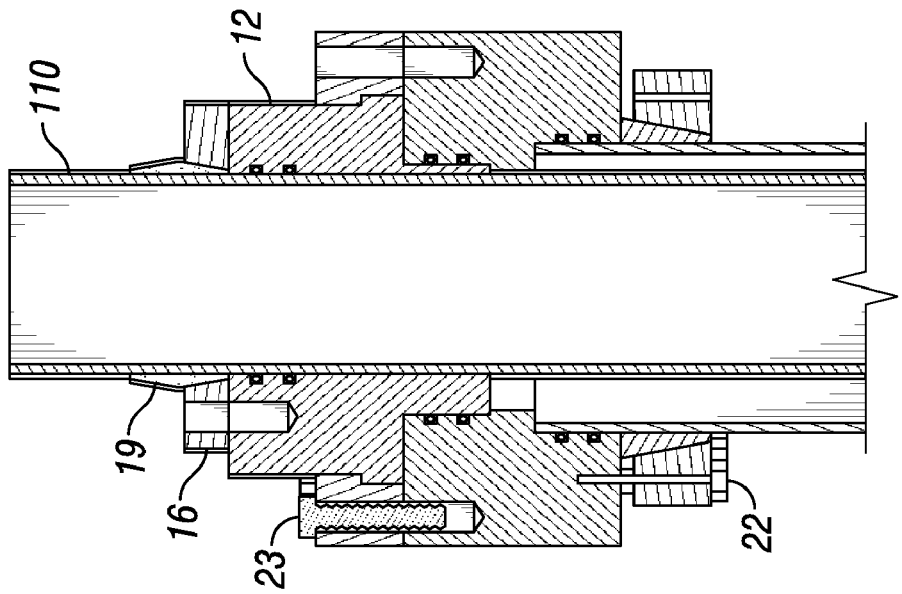
FIG. 7D is a cross-sectional view of an embodiment of the assembly including slip members.
Figure 7C:
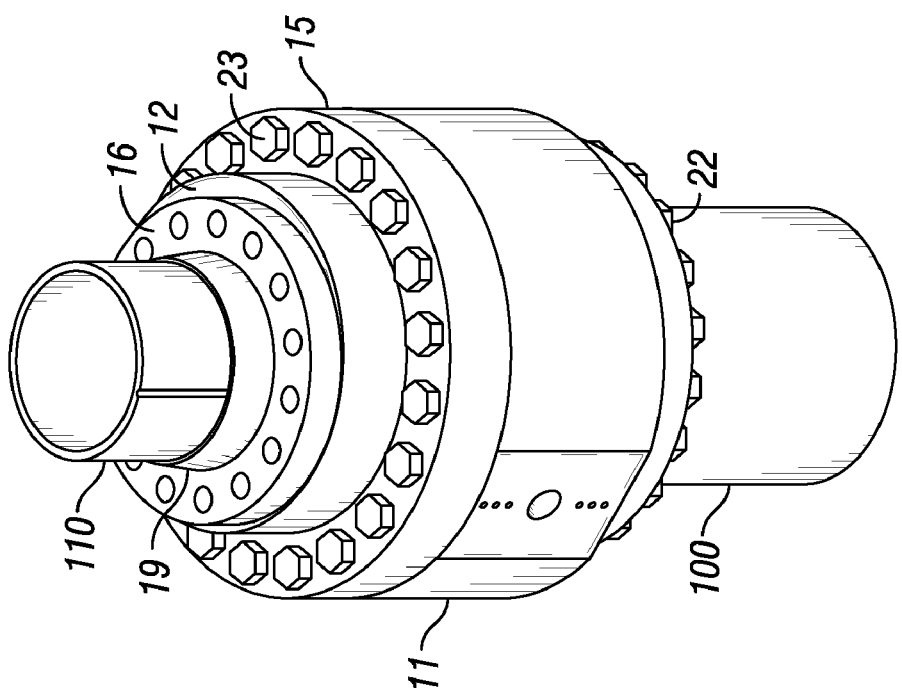
FIG. 7C is a perspective view of another embodiment of the assembly secured to the well.

Once aligned, the second annular member 12 may be secured to the first annular member 11 as illustrated in FIGS. 7A and 7B—including securing the annular members 11, 12 via a second securing ring 15 and bolts 23. As shown in FIG. 7B, a first surface of the second securing ring 15 is suitably oriented in a manner effective to engage skirt 13B to prevent the second annular member 12 from traveling along the length of the inner casing 110 beyond the second securing ring 15 during assembly 10 operation.

Turning to FIGS. 7C-7F, the second annular member 12 may be further secured to the inner casing 110 by tightening one or more second slip members 19 to the inner casing 110 via the attachment of at least a third securing ring 16 to the second annular member 12 using bolts 24 or other fasteners. Once secured, the assembly 10 is operationally configured to (1) grip and stabilize the outer and inner casings 100, 110, and, where applicable, (2) prevent an attached wellhead from coming off the well 99 due to annular pressure or other forces.

In addition, by securing the annular member 12 to the inner casing 110, the assembly 10 is operationally configured to prevent longitudinal movement between the casings 100, 110, or ballooning as the term is known to those of ordinary skill in drilling operations.

Figure 7F:
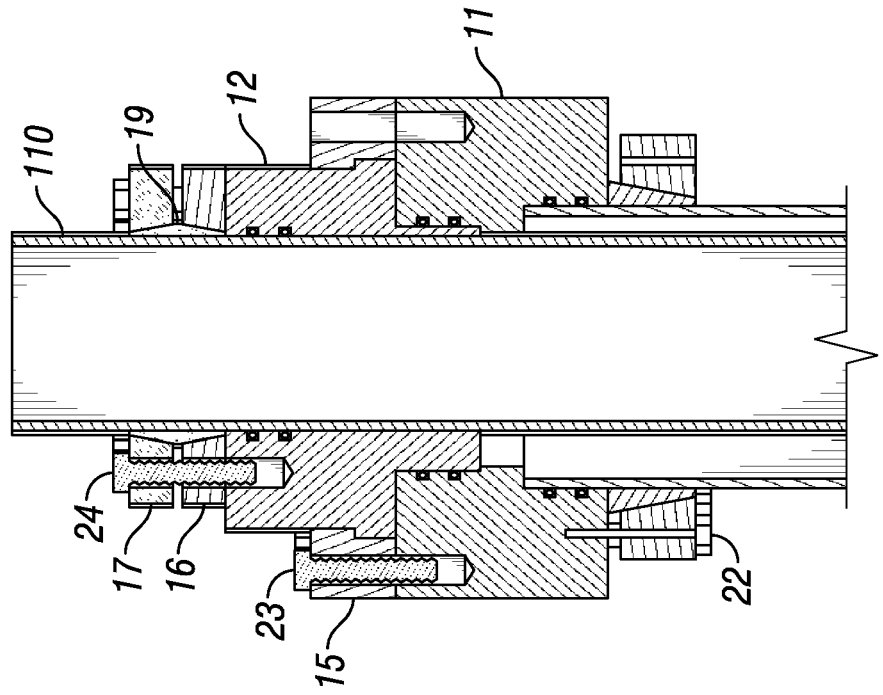
FIG. 7F is a cross-sectional view of an embodiment of the assembly including third and fourth securing rings.
Figure 7E:
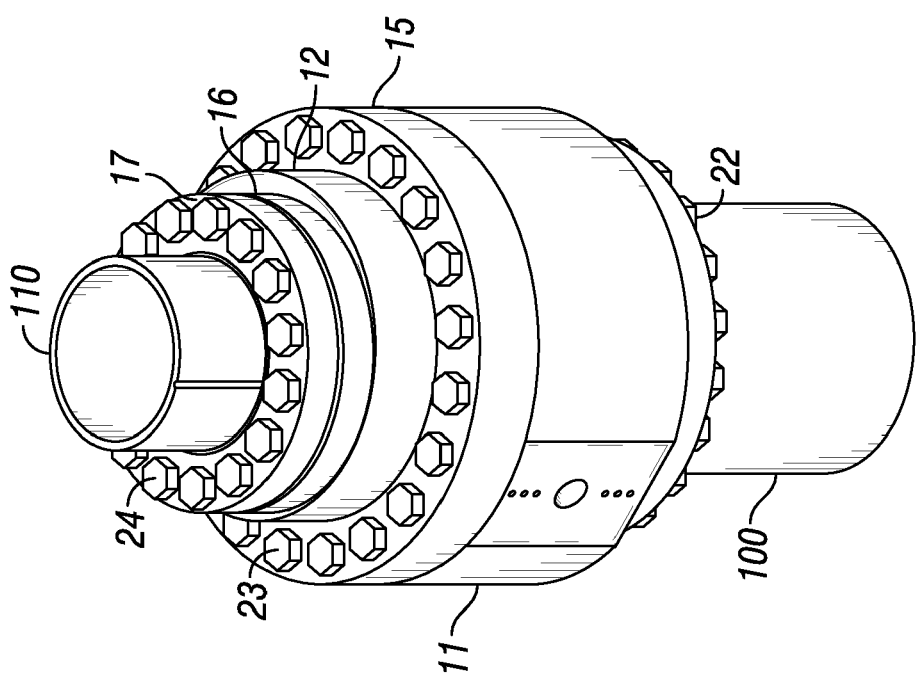
FIG. 7E is a perspective view of another embodiment of the assembly secured to a well.

In a particularly advantageous embodiment of the assembly 10 as depicted in FIGS. 7E and 7F, the second annular member 12 may be further secured to the inner casing 110 by tightening one or more second slip members 19 via the attachment of a third securing ring 16 and a fourth securing ring 17 to the second annular member 12 using bolts 24 or other fasteners. As shown in FIG. 7F, the inner surface of the third securing ring 16 and fourth securing ring 17 may be tapered according to the outer surface configuration of the one or more second slip members 19. In another embodiment, it is contemplated that the second annular member 12 may be secured to the inner casing 110 via a single securing ring, for example, the fourth securing ring 17. In other words, the second annular member 12 and third securing ring 16 may be combined as one piece. In this embodiment, at least part of the inner surface of the second annular member is suitably configured to simulate the inner surface configuration of the third securing ring 16, e.g., the inner surface of the second annular member 12 being tapered in like manner as an embodiment incorporating a third securing ring 16 having a tapered inner surface. Optionally, one or more packer elements may be installed to seal and/or isolate target annuli. In sum, the present assembly 10 is operationally configured to provide at least three sealing areas upon a target well 99: (1) the first annular member 11 being sealed to the outer casing 100; (2) the second annular member 12 being sealed to the inner casing 110; and (3) the first annular member 11 being sealed to the second annular member 12 effectively sealing off the uppermost portion of a target annulus.

Figure 8:
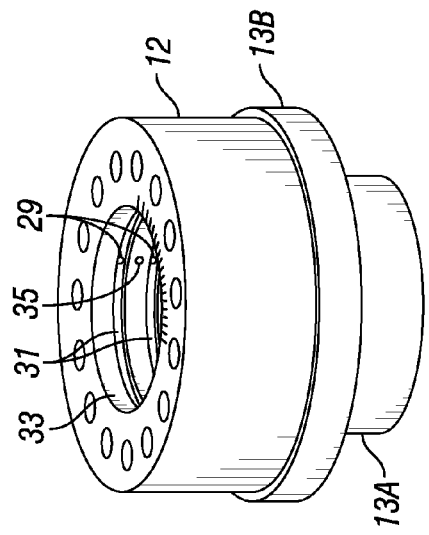
FIG. 8 is a top perspective view of an embodiment of the first annular member.
Figure 10:
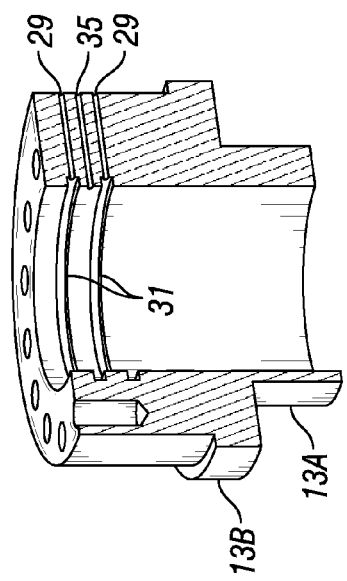
FIG. 10 is a top perspective view of an embodiment of the second annular member.
Figure 9:
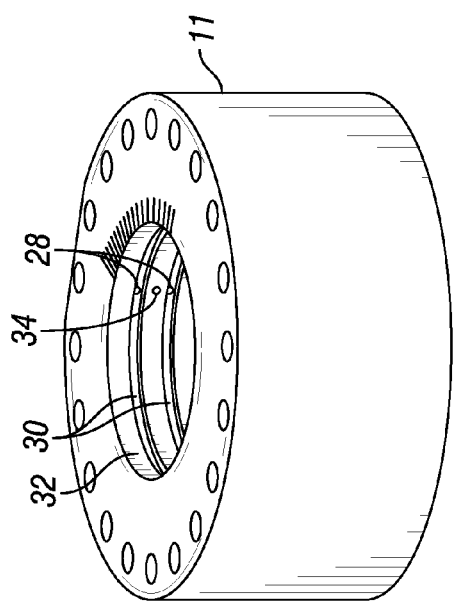
FIG. 9 is a perspective cross-sectional view of an embodiment of the first annular member.

Depending on the intended use or application, one or more sealing means may also be disposed along the inner surface of one or more of the annular members for forming a seal between the annular member and its adjacent casing. Thus, each annular member may suitably comprise a means for housing one or more seals along the inner surfaces of the annular members as desired. In one simplified embodiment, seals may be incorporated to facilitate containment of fluid pressure within the annulus between casings 100, 110. As illustrated in FIGS. 8 and 9, the inner surface 32 of the first annular member 11 may comprise one or more sealing grooves or recessed channels 30 disposed circumferentially along its bore surface 32, the grooves 30 being operationally configured to house seals or sealing material therein. Similarly in FIGS. 10 and 11, the second annular member 12 may also comprise one or more sealing grooves or recessed channels 31 disposed circumferentially along its bore surface 33, the grooves 31 being operationally configured to house seals or sealing material therein. Although not limited to a particular configuration or depth, the grooves 30 and 31 are suitably configured to accept a particular type of sealing material without comprising the ability of the corresponding annular member to control the well 99 as desired.

Although the type of seals or sealing materials employed may depend in part on the intended use of the assembly 10, suitable seals or sealing materials for use in oil and gas well applications include, but are not necessarily limited to elastomer seals. Suitable elastomer seals include, but are not necessarily limited to O-rings, P-seals, S-seals, FS-seals, T-seals, and combinations thereof. In a particularly advantageous embodiment of the assembly 10 controlling annuli in oil and gas well applications, suitable seals include P-seals. Apposite P-seals are commercially available from the following sources: UTEX, Industries, Inc., located in Weimar, Tex., USA, and MSO Seals and Gaskets, located in Houston, Tex., USA.

Each of the annular members 11, 12 may also include one or more sidewall apertures 28, 29 that extend from the outer surface of the respective annular member to the bore surface of each providing access to grooves 30 and 31. In operation, the sidewall apertures 28 and 29 may be used to pack the seals as desired. Although not limited to a particular mode of operation, in a simplified embodiment a device similar to a grease gun or packing gun may be attached to a one way fitting located at the entry point of the sidewall apertures 28, 29 connected to the groove 30 or 31 comprising a seal, e.g., P-seal, nested therein. Here, the packing device may be manual, pneumatic or hydraulic. In operation, the device suitably forces packing material (a plastic material or a flowable sealant) through the target sidewall aperture behind the seal forcing the seal to be pressed against the corresponding casing with considerable force. The one way fitting prevents the packing material from coming out and will maintain pressure on the back side of the seal. As known to persons of ordinary skill in the art, seals may be used in pairs with a test port between them so that the seals may be pressurized for testing purposes without having to pressurize the well or annular void.

Figure 11:
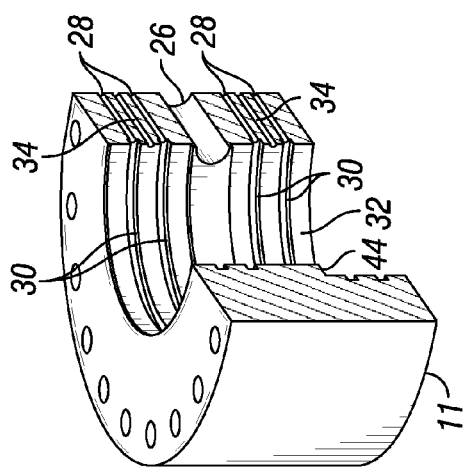
FIG. 11 is perspective cross-sectional view of an embodiment of the second annular member.

With particular reference to FIGS. 9 and 11, the first and second annular members 11 and 12 may also comprise one or more additional sidewall apertures 34 and 35 or test ports operationally configured to allow one or more fluids to pass there through as desired. In a particularly advantageous embodiment, the sidewall apertures 34, 35 are used to pressure test the assembly 10 seals, e.g., the P-seals. In operation, a pressure supply using water/glycol or another environmentally acceptable hydraulic fluid may be attached to one or more of the sidewall apertures 34 and 35 between the seals. Once attached, the sidewall apertures may be pressurized as determined by the well 99 operator(s)—typically up to a pressure below the expected maximum pressure of the target well 99 (or annular void). Depending on the location of the well 99 or as desired, a pressure gauge may be employed to provide a substantially accurate pressure of the well 99 while testing. Suitably, the pressure gauge may be monitored over a set period of time to ensure the seals are not leaking. Once tested, the pressure supply is suitably disconnected from one or more of the sidewall apertures 34 and 35 and the one or more of the sidewall apertures 34 and 35 are plugged. Pressurizing is typically accomplished via a hand pump. In other instances, a hydraulic power unit may be used. In subsea operations, hydraulic power units are typically located above the water surface and connected to the sidewall apertures 34 and 35 with hoses.

Figure 5B:
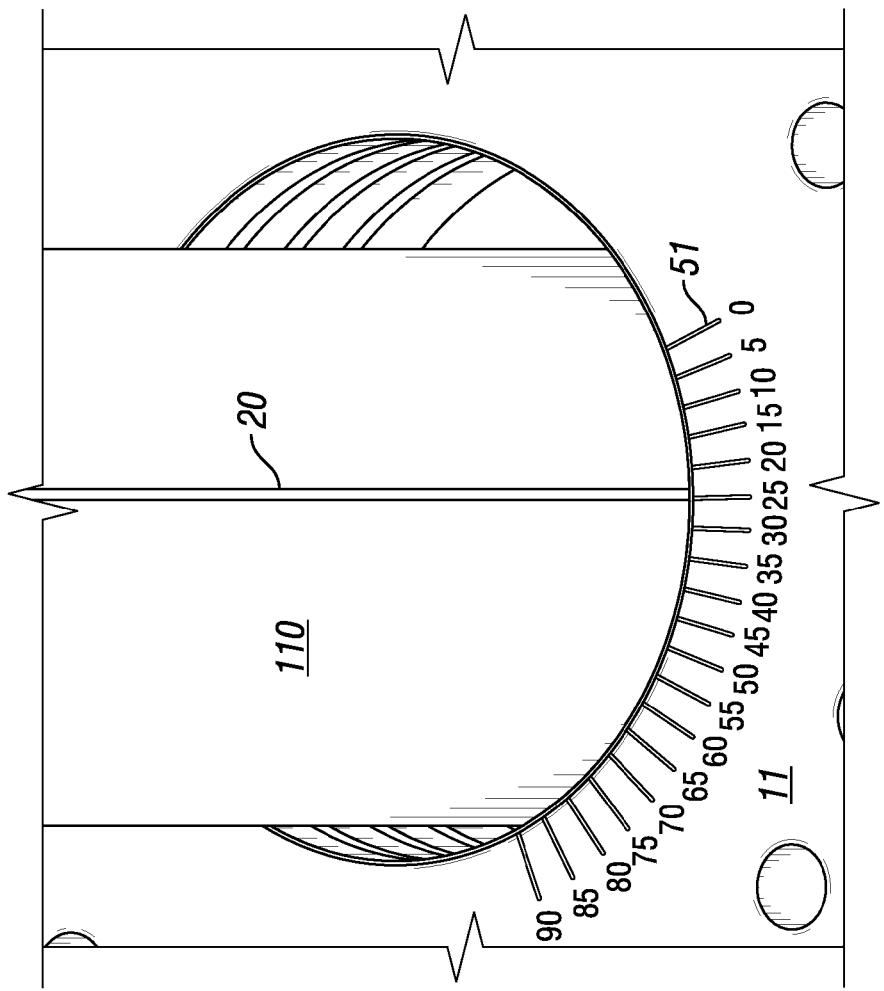
FIG. 5B is a detailed view of the first annular member including an alignment scale.
Figure 5A:
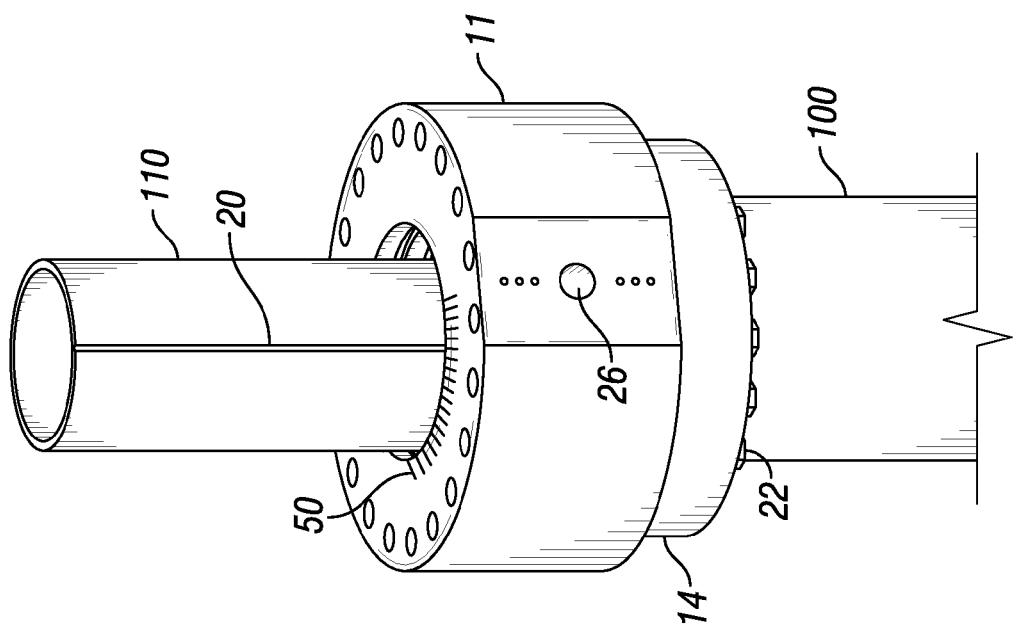
FIG. 5A is a perspective view a first annular member in a secured orientation with a well.

With particular reference to FIG. 5A and FIG. 9, the first annular member 11 may additionally comprise a check aperture 26 operationally configured to allow operators to perform one or more of the following tasks: (1) monitor annular pressure within the target well 99; (2) transport flowable well control materials from the surface therethrough; (3) collect fluid product such as oil and gas therethrough; and (4) monitor the flow of fluids therethrough. In a subsea operation where the well 99 is on vacuum, i.e., where a well 99 has a negative pressure and is taking in ambient water, the check aperture 26 may be used to monitor and control the flow of seawater into the well 99.

In one suitable mode of operation, the check aperture 26 lies in fluid communication with a surface operations device via a conduit such as a hose or like connection. A suitable operations device includes a control panel and/or gauges such as pressure and flow gauges and/or valves to direct the flow of various materials to and from the check aperture 26 as desired. For example, control materials may be pumped from the surface through the operations device and conduit to the well 99. In another example, material produced by the target well 99 may be delivered through the conduit and collected, vented, flared off, or incinerated as desired.

The check aperture 26 may be formed in the first annular member 11 prior to assembly 10 installation to allow access to the target annulus from the exterior of the assembly 10. In another embodiment, the check aperture 26 may be formed in the first annular member 11 after assembly 10 installation. Preferably, the check aperture 26 extends from the outer surface of the first annular member 11 to the bore surface 32 as depicted in FIG. 9. Depending on the intended use of the assembly 10, the check aperture 26 may be threaded whereby a nipple or other capping means may be attached to the check aperture 26.

As stated above, each of the annular members 11, 12 suitably comprise eccentric bores therethrough. In one embodiment, the bores are offset according to the control requirements of the target well 99. In one embodiment, the annular members 11, 12 may comprise eccentric bores of distinct offsets. In another embodiment, the annular members 11, 12 may comprise eccentric bores of substantially similar offset, so that as the annular members 11, 12 are assembled with the offsets in substantially the same direction maximum offset is achieved. Accordingly, by assembling the annular members 11, 12 in any configuration in-between, any other amount of eccentricity may be achieved between the annular members 11, 12.

The invention will be better understood with reference to the following non-limiting examples, which is illustrative only and not intended to limit the present invention to a particular embodiment.

EXAMPLE 1

In a first non-limiting example, a simplified assembly 10 is installed on a well 99 having non-concentric casings 100, 110 including an exposed inner casing 110.

First, the minimum annular distance 300 between casings 100, 110 is located and marked with line marking 20 along the outer wall of the inner casing. Second, the minimum annular distance 300 is measured and recorded as about 0.375 inches (about 0.95 cm). Third, the annular distance 400 between the same casings 100, 110 if concentric to one another is calculated as about 1.375 inches (about 3.5 cm). Fourth, the minimum annular distance 300 is divided by the annular distance 400. Next, the resulting quotient is multiplied by 90 degrees to provide an alignment value as follows:

$$0.375/1.375 \times 90 \text{ degrees} = 24.5 \text{ degrees}$$

Once the alignment value is determined, the first securing ring 14 and the first annular member 11 are installed as shown in FIG. 5A and 5B. The first annular member 11 is slipped over the inner casing 110 and rotated until the tick mark 51 representative of the alignment value 24.5 is aligned with the line marking 20. Thereafter, the first annular member 11 is secured to the outer casing 100.

Once the first annular member 11 is secure, the second annular member 12 is installed as shown in FIG. 6A and 6B. The second annular member 12 is slipped over the inner casing 110 and rotated until the tick mark 51 representative of the alignment value 24.5 is aligned with the line marking 20. Once aligned and set in abutment to the first annular member 11, the second annular member 12 is secured to the first annular member 11 as illustrated in FIGS. 7A and 7B.

EXAMPLE 2

In a second non-limiting example, an assembly 10 is provided to control the annulus between casings in an oil or gas well including the following dimensions:
Outer Casing
  Outer Diameter: about 13.38 inches (33.99 cm)
  Inner Diameter: about 12.38 inches (31.45 cm)
Inner Casing
  Outer Diameter: about 9.63 inches (24.46 cm)
  Inner Diameter: about 8.63 inches (21.92 cm)
The assembly 10 and accompanying components have the following characteristics:
  a) First Annular Member 11
  Material of Construction: 4140 Grade High Carbon Steel
  Length: about 10.0 inches (25.4 cm)
  Outer Diameter: about 24.0 inches (60.96 cm)
  Inner Diameter of First Section: about 13.38 inches (33.99 cm)
  Inner Diameter of Second Section: about 12.0 inches (30.48 cm)
  Depth of Grooves 30: (two total): about 0.50 inches (1.27 cm)
  Width of Sidewall Apertures 28: (two total) about 0.25 inches (0.64 cm)
  Width of Sidewall Apertures 34: about 0.25 inches (0.64 cm)
  Width of Check Aperture 26: about 1.75 inches (4.45 cm)
  Number of Bolt Holes: 20
  b) Second Annular Member 12
  Material of Construction: 4140 Grade High Carbon Steel
  Length: about 12.0 inches (30.48 cm)
  Outer Diameter: about 17.5 inches (44.45 cm)
  Outer Diameter of Skirt 13B: about 18.5 inches (46.99 cm)
  Outer Diameter of Neck 13A: about 12.0 inches (30.48 cm)
  Inner Diameter: about 9.63 inches (24.46 cm)
  Length of Neck 13A: about 4.00 inches (10.16 cm)
  Depth of Grooves 31: about 0.50 inches (1.27 cm) (two total)
  Width of Sidewall Apertures 29: about 0.25 inches (0.64 cm) (two total)
  Width of Sidewall Apertures 35: about 0.25 inches (0.64 cm)
  Number of Bolt Holes: 15
  c) First Securing Ring 14
  Material of Construction: 4140 Grade High Carbon Steel
  Length: about 3.50 inches (8.89 cm)
  Outer Diameter: about 20.13 inches (51.13 cm)
  Inner Diameter: about 14.13 inches (35.89 cm)
  Number of Bolt Holes: 20
  d) Second Securing Ring 15
  Material of Construction: 4140 Grade High Carbon Steel
  Length: about 4.00 inches (10.16 cm)
  Outer Diameter: about 24.0 inches (60.96 cm)
  Inner Diameter: about 17.5 inches (44.45 cm)
  Number of Bolt Holes: 20
  e) Third Securing Ring 16
  Material of Construction: 4140 Grade High Carbon Steel
  Length: about 2.00 inches (5.08 cm)
  Outer Diameter: about 16.13 inches (40.97 cm)
  Inner Diameter: about 10.0 inches (25.4 cm)
  Number of Bolt Holes: 15
  f) Fourth Securing Ring 17
  Material of Construction: 4140 Grade High Carbon Steel
  Length: about 2.00 inches (5.08 cm)
  Outer Diameter: about 16.13 inches (40.97 cm)
  Inner Diameter: about 10.0 inches (25.4 cm)
  Number of Bolt Holes: 15
  g) First Slip Member 18
  Material of Construction: Case Hardened 4140 Steel
  Outer Diameter: about 15.5 inches (39.8 cm)
  Inner Diameter: about 13.38 inches (33.99 cm)
  Height: about 4.00 inches (10.16 cm)
  h) Second Slip Member 19
  Material of Construction: Case Hardened 4140 Steel
  Outer Diameter: about 11.0 inches (27.9 cm)
  Inner Diameter: about 9.63 inches (24.5 cm)
  Height: about 4.00 inches (10.2 cm)

Persons of ordinary skill in the art will recognize that many modifications may be made to the present assembly, system and method without departing from the spirit and scope thereof. The embodiment(s) described herein are meant to be illustrative only and should not be taken as limiting the invention, which is defined in the claims.

I claim:

1. An assembly for controlling an annulus between tubulars comprising:
   a first annular member securable to an outer tubular;
   a second annular member securable to the first annular member;
   wherein each of the first and second annular members have eccentric bores therethrough;
   wherein the tubulars are nonconcentric; and
   wherein the orientation of the annular members about the tubulars is determined by a value derived from the following equation:

$$\text{Alignment Value} = D^1/D^2 \times 90$$

where
   (1) $D^1$=the minimum annular distance between non-concentric tubulars;
   (2) $D^2$=the annular distance between the same tubulars if concentric to one another; and
   (3) 90 represents the maximum rotational orientation required of each annular member to travel through a complete range of offsets.

2. The assembly of claim 1, wherein the first and second annular members include corresponding alignment scales effective for aligning each annular member about the tubular members according to calculated Alignment Value.

3. The assembly of claim 2 wherein each alignment scale includes a circular scale comprising a plurality of tick marks along the inner edge of the bore wall of the corresponding annular member, the tick marks representing intervals including a sweep angle ranging from zero degrees up to 360 degrees.

4. The assembly of claim 3 wherein the tick marks represent intervals including a sweep angle from zero degrees up to at least about 90 degrees with tick marks representing one degree intervals.

5. A method for controlling an annulus between nonconcentric tubulars comprising the following:
   providing an assembly including a first annular member securable to an outer tubular; a second annular member securable to the first annular member; wherein each of the first and second annular members have eccentric bores therethrough and wherein the first and second annular members have corresponding alignment scales effective for aligning each annular member about the tubular members in a manner effective for controlling the annulus, each alignment scale including a circular scale comprising a plurality of tick marks along the inner edge of the bore wall of the corresponding annular member, the tick marks representing intervals including a sweep angle ranging from zero degrees up to at least about 90 degrees;

determining the angular relationship between the tubulars and the first and second annular members;

securing the first annular member to the outer tubular at an orientation according to said relationship; and securing the second annular member to the first annular member at an orientation according to said relationship.

6. The method of claim 5 wherein each of the first and second annular members have eccentric bores of substantially equal offset therethrough.

7. The method of claim 5 wherein the orientation of the annular members about the tubulars is determined by a value derived from the following equation:

$$\text{Alignment Value} = D^1/D^2 \times 90$$

where
(1) $D^1$=the minimum annular distance between non-concentric tubulars;
(2) $D^2$=the annular distance between the same tubulars if concentric to one another; and
(3) 90 represents the maximum rotational orientation required of each annular member to travel through a complete range of offsets.

8. The method of claim 5 further comprising the step of exposing the inner tubular prior to securing the first annular member to the outer tubular.

9. The method of claim 7 wherein each of the first and second annular members have eccentric bores of substantially equal offset therethrough.

* * * * *